(12) United States Patent
Ross

(10) Patent No.: US 10,425,833 B2
(45) Date of Patent: Sep. 24, 2019

(54) WIRELESS NETWORK SYSTEM WITH MULTIPLE ACCESS POINT LAYERS

(71) Applicant: CENTER FOR MEDICAL INTEROPERABILITY INC., Nashville, TN (US)

(72) Inventor: Mitchell A. Ross, Nashville, TN (US)

(73) Assignee: Center For Medical Interoperability Inc., Nashville, TN (US)

( * ) Notice: Subject to any disclaimer, the term of this patent is extended or adjusted under 35 U.S.C. 154(b) by 0 days.

(21) Appl. No.: 16/121,690

(22) Filed: Sep. 5, 2018

(65) Prior Publication Data

US 2019/0028901 A1 Jan. 24, 2019

Related U.S. Application Data

(63) Continuation of application No. 15/961,940, filed on Apr. 25, 2018.

(60) Provisional application No. 62/489,893, filed on Apr. 25, 2017.

(51) Int. Cl.
| | |
|---|---|
| *H04W 16/20* | (2009.01) |
| *H04W 88/08* | (2009.01) |
| *H04L 12/24* | (2006.01) |
| *H04W 84/12* | (2009.01) |

(52) U.S. Cl.
CPC ........... *H04W 16/20* (2013.01); *H04L 41/145* (2013.01); *H04W 88/08* (2013.01); *H04W 84/12* (2013.01)

(58) Field of Classification Search
CPC ...... H04W 16/18–32; H04L 41/14–147; G06F 17/509
See application file for complete search history.

(56) References Cited

U.S. PATENT DOCUMENTS

| | | | | |
|---|---|---|---|---|
| 6,188,894 B1* | 2/2001 | Clancy | ................ | H04W 16/18 455/423 |
| 8,654,672 B1* | 2/2014 | Nicholas | ............... | H04W 16/18 370/254 |
| 9,723,510 B1* | 8/2017 | Beluri | ................... | H04W 24/10 |
| 9,788,213 B1* | 10/2017 | Nicholas | ............... | H04W 16/18 |
| 2004/0196813 A1 | 10/2004 | Ofek et al. | | |
| 2004/0236547 A1* | 11/2004 | Rappaport | ............ | G06F 17/509 703/2 |
| 2008/0166973 A1 | 7/2008 | Hart et al. | | |

(Continued)

OTHER PUBLICATIONS

International Searching Authority, International Search Report and Written Opinion, PCT/US2018/29253, dated Aug. 1, 2018.

*Primary Examiner* — Pao Sinkantarakorn
(74) *Attorney, Agent, or Firm* — Wayne Edward Ramage; Baker Donelson

(57) ABSTRACT

A multiple overlapping layer wireless network system for providing coverage in a multiple-office or business environment with multiple APs, and an improved method of designing and installing these multiple layers of wireless networks. Multiple overlapping wireless networks (i.e., multiple layers) are superimposed in the same area, and offset from each other according to their geometry. This results in a multiple wireless network installation with sufficient signal coverage in all areas for all networks with minimal inter-AP interference, segregated traffic, and multiple connections for each wireless network to one or more wired networks, thereby reducing the possibility of a single point of failure.

18 Claims, 21 Drawing Sheets

(56) References Cited

U.S. PATENT DOCUMENTS

2011/0013557 A1    1/2011   Westberg et al.
2015/0264579 A1    9/2015   Claussen

* cited by examiner

WIRELESS NETWORK SYSTEM WITH MULTIPLE ACCESS POINT LAYERS This application is a continuation of and claims benefit to U.S. patent application Ser. No. 15/961,940, filed Apr. 25, 2018, which claims benefit of and priority to U.S. Provisional App. No. 62/489,893, filed Apr. 25, 2018, and is entitled to the benefit of those dates for priority. The specifications, drawings and disclosures of U.S. Provisional App. No. 62/489,893 and U.S. patent application Ser. No. 15/961,940 are incorporated herein in their entireties by specific reference for all purposes.

FIELD OF INVENTION

The present invention relates to a system and method for designing and installing a multiple-layer wireless network system.

BACKGROUND OF INVENTION

For wireless computer networks, a wireless access point (AP or WAP) is a network hardware device, typically connected to a wired network, that provides wireless access to the network. APs usually are managed by a WLAN (wireless local area network) controller or similar device that manages adjustments to RF (radio frequency) power, channel, authentication, and security for the network. Multiple wireless devices can be connected to a single wired connection. The AP hardware device may be a standalone device connected to a router, or may be integrated with a router device.

The number of clients or user devices that can be supported by an AP depends on a number of factors, such as, but not limited to, the type of APs in use, the number of radios in the AP (most APs typically have between 1 to 4 radios), desired client throughput, and the density of the client environment. The range of communication for an AP also varies significantly, depending not only on the type of AP (e.g., type of antenna, operating radio frequencies, power output, and the like), but also on external factors, such as, but not limited to, indoor/outdoor placement, height, nearby obstructions or obstacles, and other nearby APs or electronic devices that may actively interference with broadcast signals. Problems such as lack of coverage, weak or absent signals, and interference often occur with installation of a single layer wireless network with multiple APs. These problems are exacerbated with multiple layer networks, i.e., multiple wireless networks installed in an overlapping or substantially overlapping area, such as in a multiple-office or business environment where multiple networks are desired (e.g., a primary highly secure network limited to employees, and a secondary "guest" network open to clients, visitor and other forms of guests).

DETAILED DESCRIPTION OF EXEMPLARY EMBODIMENTS

Figure 1:
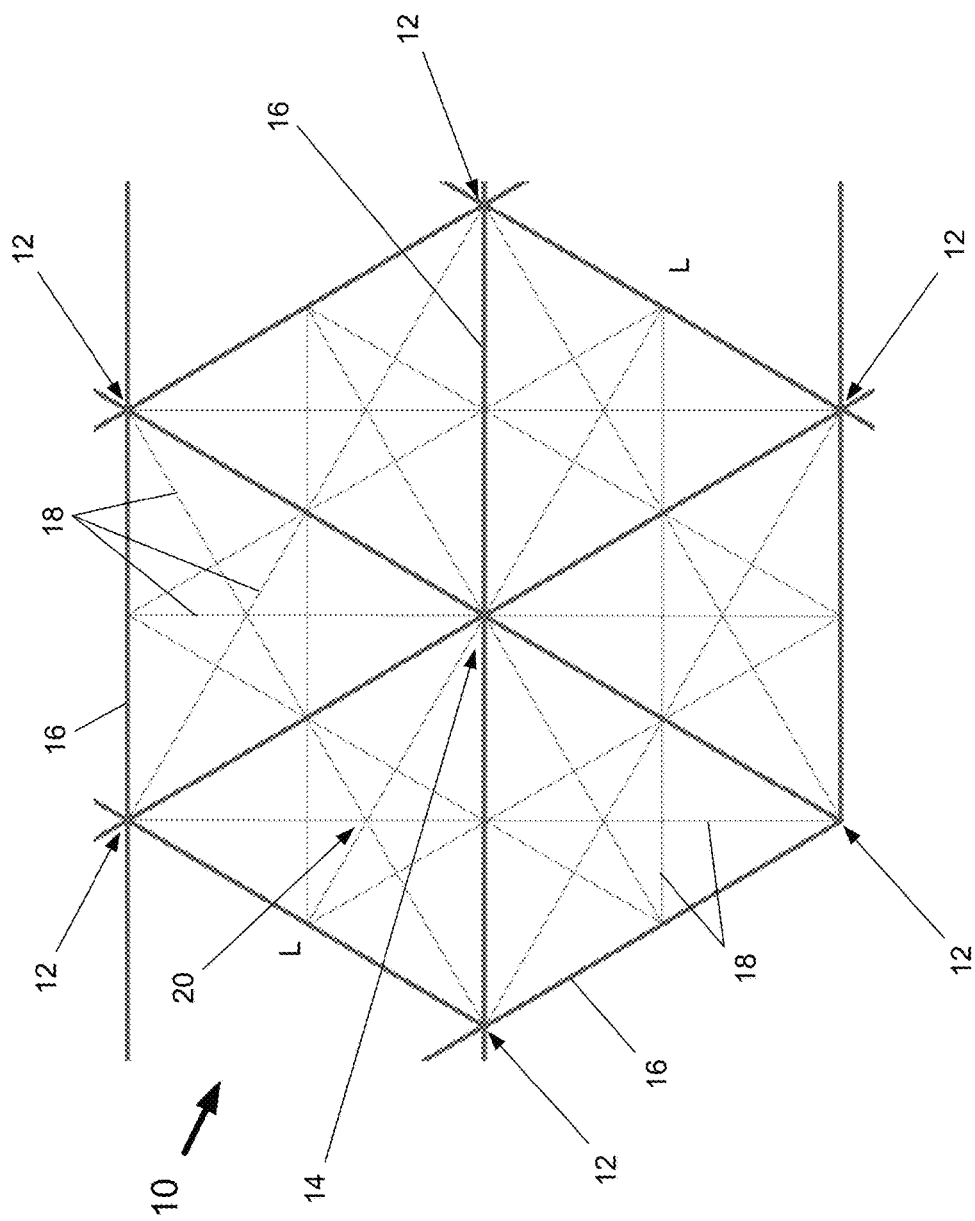
FIG. 1 shows a base repeating hexagonal unit that forms the grid for each layer.

In various exemplary embodiments, the present invention addresses the interference and other problems with prior art wireless networks with an improved method of designing and installing multiple layers of wireless networks in a multiple-office or business environment with multiple APs. The present invention superimposes multiple overlapping wireless networks (i.e., multiple layers) in the same area, each with multiple APs. The present invention thus results in a multiple wireless network installation with sufficient signal coverage in all areas for all networks with minimal inter-AP interference, along with multiple connections for each wireless network to one or more wired networks, thereby reducing the possibility of a single point of failure.

For clarity and ease of reference, different wireless network layers shall be referred to herein numerically as first (layer 1), second (layer 2), third (layer 3), fourth (layer 4), and so on. In practice, other forms of wireless network layer labels or designators may be used, including, but not limited to, alphabetic (e.g., A, B, C), alpha-numeric, colors (e.g., red, green, blue), or names (e.g., primary, support, guest), or combinations thereof. Further, in some of the exemplary embodiments described below, a hierarchical priority is assumed, i.e., with the first layer as being most critical or important, with level of importance decreasing with each succeeding layer. The first layer thus is the one of primary concern with regard to initial placement of APs and later adjustments in placement (if needed). However, a person of skill in the art will recognize that, regardless of label, different layers may have the same or different priority or security levels, or hierarchies, depending on the nature of the installation.

In the past, wireless network planning typically has been framed as an RF problem: i.e., how far can one propagate a signal of some strength to meet a desired data rate. In several embodiments, the present invention designs for capacity first. That is, the design must first take into account the number of active connections and the bandwidth required per connection, then check the RF. The first step is determining the number of total users of the network, and the fraction of users actively connected in a given room or areas (i.e., coverage area). With current technology, the maximum planned number of active users per AP should range from 15 to 25 active users, depending on the application (low throughput uses allowing a higher number of users, while high throughput uses needing fewer number of users). This determines the number of APs which are required with the coverage area. Placement of the APs as part of the design process is discussed below. The second step is then placing the required numbers of APs within the selected coverage area. Power is typically turned down at this point, and channels are selected for the wireless frequency domain (layer) for the specific SSIDs (i.e., service set identifier, a unique ID consisting of 32 characters used for naming wireless networks). After placement, the third step is checking for overall RF coverage within the coverage area. Any gaps in coverage are identified and remediated, such as placing gap APs to fill the gap, with power on the gap APs set to minimize coverage bleed to high capacity coverage areas.

In several embodiments, designing a multiple layer wireless network installation for a space or area involves sequentially superimposing a hexagonal grid for each layer on a map or plan for the space or area. AP placement points for a layer are determined based upon intersections of major or minor lines within the grid. Each successive grid is offset in a certain manner from the preceding grid or grids, as discussed in more detail below. Adjustment of AP placement points may be made to address structural or other interference issues (e.g., where an AP placement point according to the grid would be in a building pillar), or areas with lack of coverage (i.e., coverage holes or gaps).

FIG. 1 shows a base repeating hexagonal unit 10 that forms the grid for each layer, each hexagonal unit with six vertices 12 and a center point 14. "Major" lines 16 extend between adjacent vertices (i.e., as the perimeter of the hexagon) and between each vertex and the center point (i.e., as "legs"), dividing the hexagonal unit into six equilateral triangles, with each major line (or "leg"(having a length L. The length (L) of the major lines may vary, depending on the particular application and technology used. In one exemplary embodiment, L=48 feet. At 48 feet, the completed design produces an average coverage area of approximately 1810 square feet per AP in the layer (or about 603 square feet per AP for three layers, i.e., ⅓rd). The average coverage area varies with L, with larger L resulting in lower density (approximately 1920 square feet per AP for L=50 feet; approximately 2123 square feet per AP for L=52 feet; approximately 2463 square feet per AP for L=56 feet; and approximately 2827 square feet per AP for L=60 feet).

The hexagonal unit also comprises a plurality of "minor" lines 18 that traverse the interior of the hexagon. Some minor lines run between alternating vertices (i.e., every other vertex), some run between the centerpoints of alternating outer sides of the hexagon, and yet a third set of minor lines run between the centerpoints of opposing outer sides of the hexagon.

This arrangement of minor and major lines results in the geometric figures shown in FIG. 1. The lines intersect to form corresponding triangles. The intersections of the major lines (i.e., the vertices 12 and center point 14 of the hexagonal unit) are initial AP placement points within the grid. As discussed below, the minor lines serve as guides to adjust the initial location of APs from the intersections of the major lines, when necessary (such as when an initial AP is outside the building walls, or in a locations, such as an elevator shaft, where an AP cannot be placed).

Figure 2:
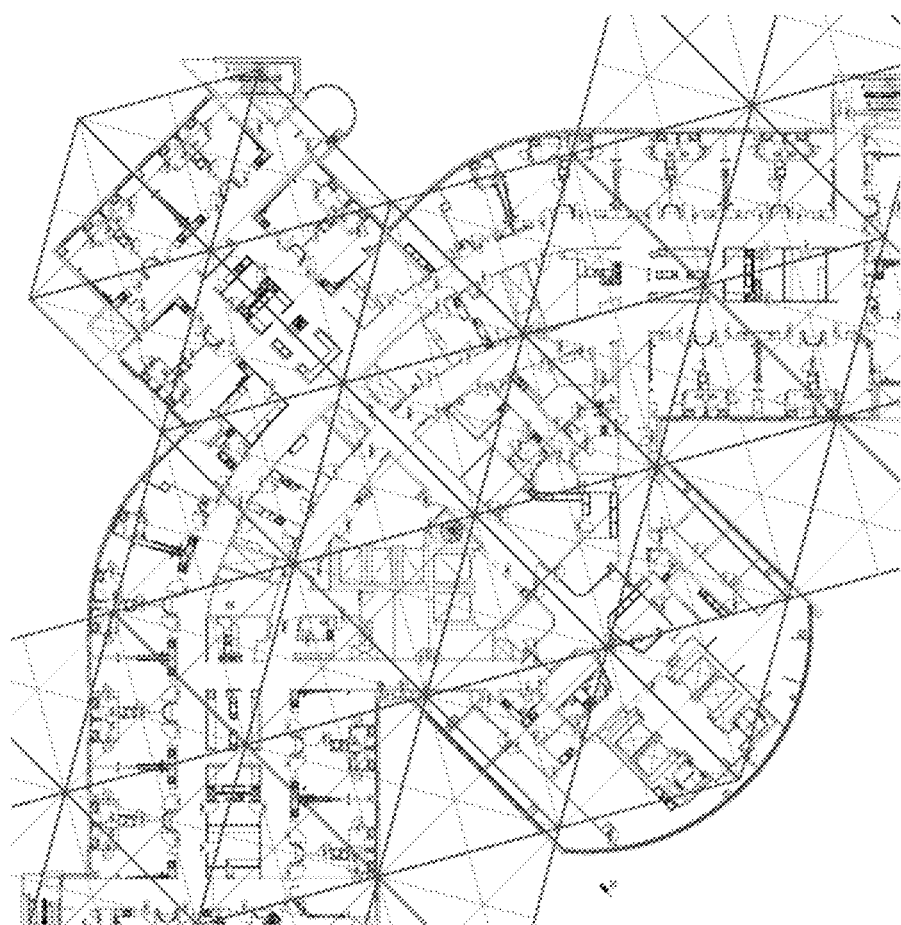
FIG. 2 shows a hexagonal grid or matrix superimposed on a building floor plan.

The hexagonal unit is repeated to form a grid or matrix of sufficient dimension and configuration to cover the entire area or space to be covered (e.g., a building floor plan), as seen in FIG. 2. The grid need not be uniform or symmetrical, and portions can be extended as necessary using partial hexagonal units (i.e., additional equilateral triangles formed by major lines). If possible, the grid encompasses the entire area or space, so that grid elements extend beyond the walls of a floor plan, for example. In a computer-based drawing program, all of the elements for a grid can be grouped into a single object.

In the embodiment shown, the first grid (for layer 1) is positioned first. As noted above, the subsequent grids (for layers 2 and 3) will be added in order. The goal is to provide equal and complete coverage with the first grid to the greatest extent possible, with succeeding layers arranged to provide a best fit.

For positioning, the first grid elements should be arranged so that a number of initial AP placement points reside along the general outside edges of the building envelope (as shown on the floor plan) and fall just inside the building walls. The grid may be rotated. The grid also may also be shrunk (i.e., resized) uniformly if needed to fit AP placement points (e.g., L may be reduced to no less than 40 feet).

Ideally, these AP placement points are not further from the edge of the building than a distance equivalent from the center of the base to the mid-point 20 of one of the primary equilateral triangles formed by adjacent major lines. It should be noted that the mid-point distance from a triangle base line is one-third of the height for an equilateral triangle (i.e., less than one-half of the height). The grid then may be adjusted (i.e., moved as a unit) on the underlying floor plan or drawing so it does not predominately place AP placement points on tops of walls or other obstructions, but does include AP placement points in critical areas (e.g., nursing stations, and the like). When the geometry causes the APs of a given layer to be lined up going down a corridor, the grid should be moved relative to the floor plan (and possibly shrunk), so that the APs no longer end up down a corridor. It should be noted that in some cases where a section of the grid has been fairly closely fit to a building corner or exterior wall, the extension of the grid outside that building wall or corner may be excluded.

The creation of the grids and the superimposition process can be done with a suitable computer-based drawing program, such as AutoCAD, on a computing device with a display. Major lines may be thicker than minor lines (or otherwise distinguished, such as by solid vs. dashed lines), and different grids may be different colors. The computing device renders a building floor plan (or similar map of a space in which the wireless networks will be installed) in electronic form, and then the grids are added as overlays over the floor plan. In some embodiments, the fitting of a grid to a floor plan may be performed automatically or semi-automatically by a fitting program applying fitting rules.

With adjustments, the "honeycomb" pattern of the grid typically will align well with either the main part of a building or floor, or at least two adjacent corners of the building or floor. As seen in FIG. 2, the grid has been rotated approximately 45 degrees with respect to the orientation shown in FIG. 1 (some minor lines have been removed for clarity). One major axis of the grid thus aligns with the main section of the building floor plan, and the lower left hexagon fits into the space between the outer walls at the rounded end of the main section.

Figure 3:
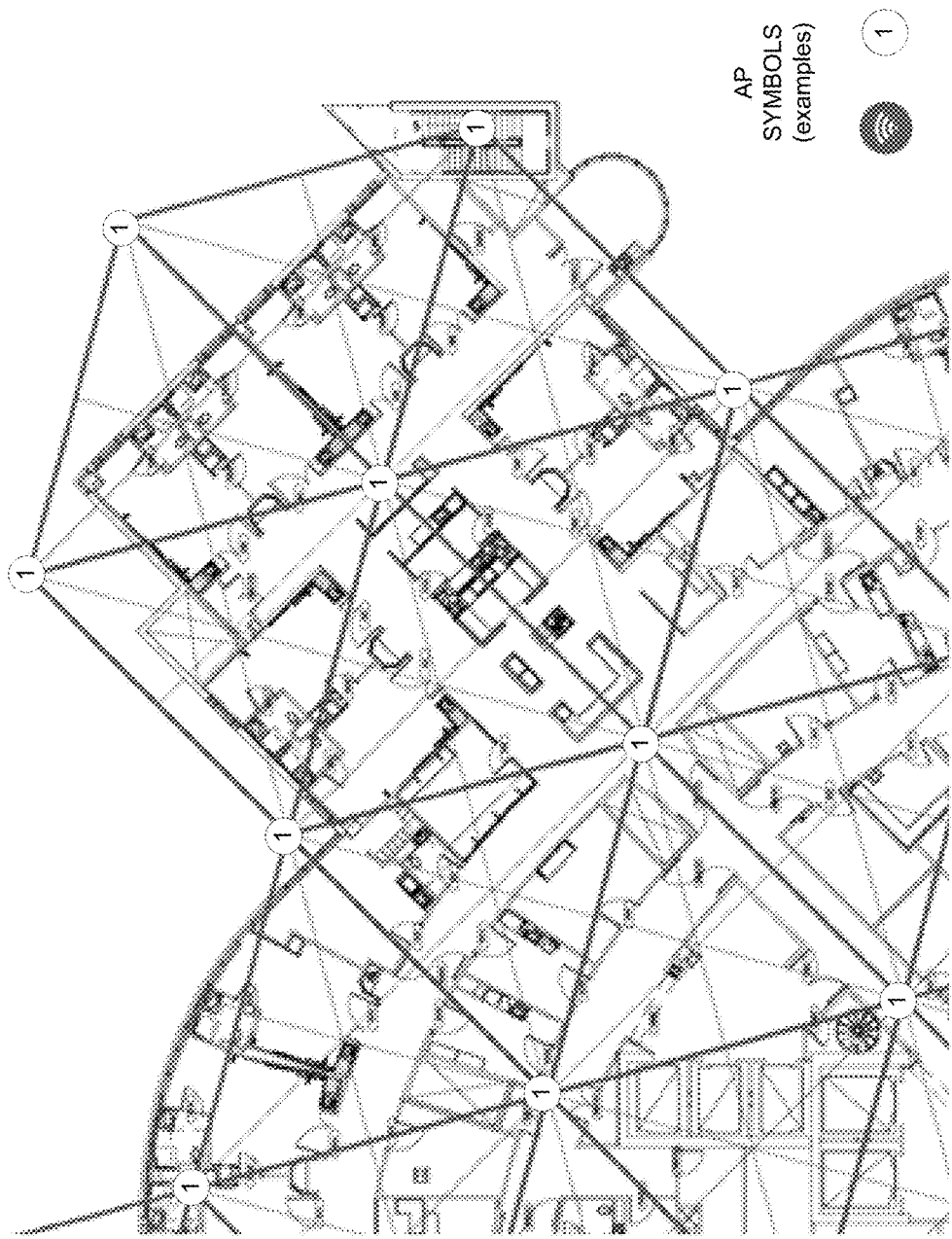
FIG. 3 shows examples of AP symbols on a subsection of the grid of FIG. 2.

Once the first grid has been initially positioned, an appropriate AP symbol can be added at each major line intersection for the grid. The AP symbol may be colored to match the grid color (if color is used), or other indicia may be used (such as a number in a circle, where the number corresponds to the layer number), or combinations thereof. FIG. 3 shows examples of AP symbols on a subsection of the grid of FIG. 2.

Figure 4:
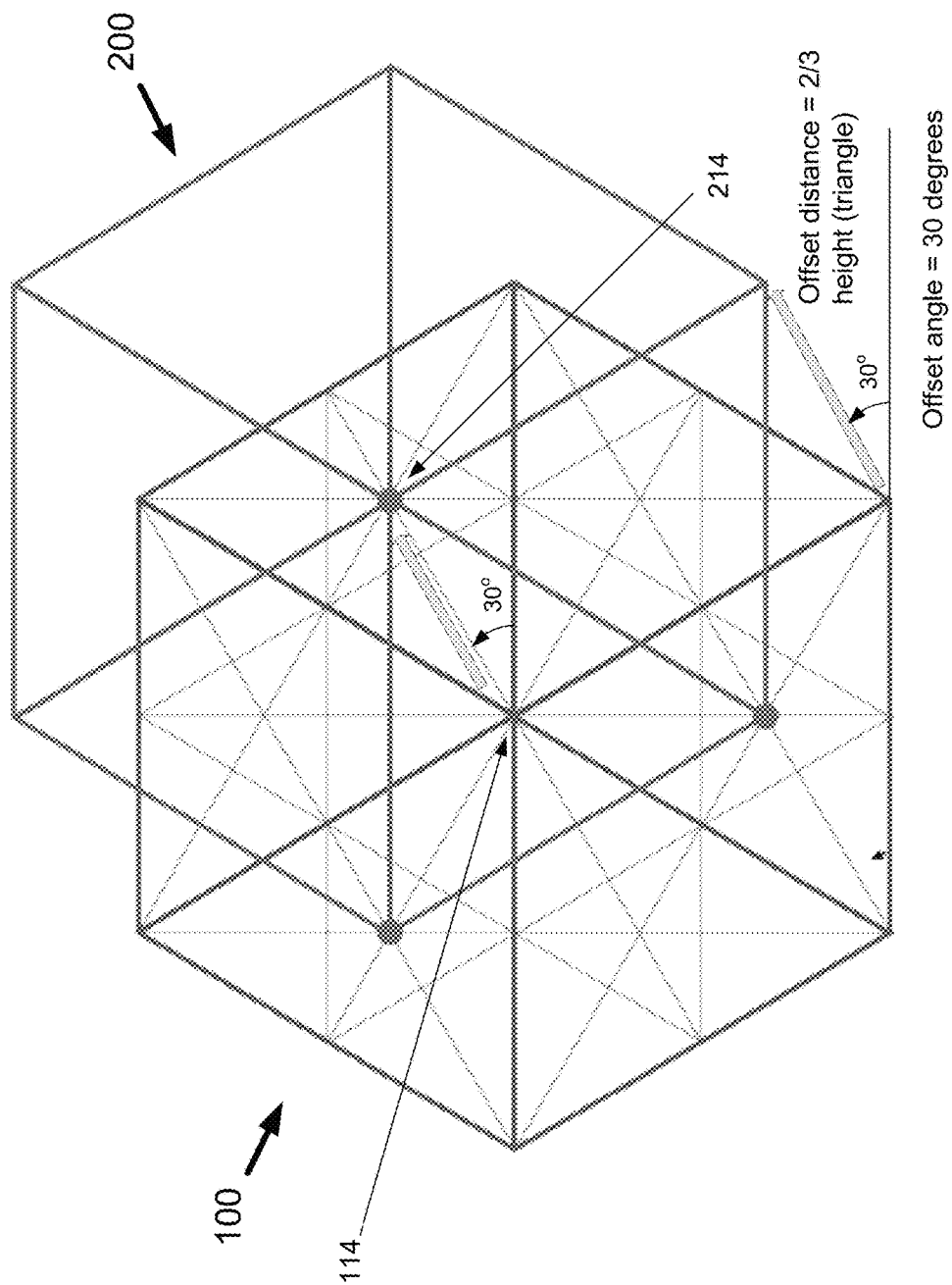
FIG. 4 shows the offset of a second grid hexagonal unit from the first grid hexagonal unit.

The grids or matrices for additional layers can be added by duplicating the first grid, applying a different color (if colors are used) or otherwise modifying its appearance to distinguish it from other grids, and offsetting it appropriately from preceding grids. For the second grid, the offset is movement of the centerpoint of the hexagonal units in the second grid to the midpoint of an equilateral triangle in the corresponding hexagon units in the first grid. FIG. 4 shows the offset of a second grid hexagonal unit 200 (shown without interior minor lines for clarity) from a first grid hexagonal unit 100 (shown with interior minor lines). The centerpoint 214 of the second grid hexagonal unit is located at the midpoint of the "northeast" equilateral triangle of the first grid hexagonal unit, and the centerpoint 114 of the first grid hexagonal unit is located at the midpoint of the "southwest" equilateral triangle of the second grid hexagonal unit. The major line intersections in the second grid are thus located in every other (i.e., every second) equilateral triangle in the first grid. This is equivalent to offsetting the second grid from the first grid a distance of ⅔ of the height of one of the equilateral triangles at a 30-degree angle with respect to a maximal diameter line (or circumdiameter) of the hexagon (i.e., in FIG. 4, the horizontal line).

As the duplication and offsetting of the second grid may have caused portions of the underlying floor plan to become uncovered (i.e., exposed) with respect to the second grid, additional hexagonal units, or equilateral triangle sections thereof, may be added to cover exposed areas. When completed, AP symbols may be added to the second grid as well.

Figure 5:
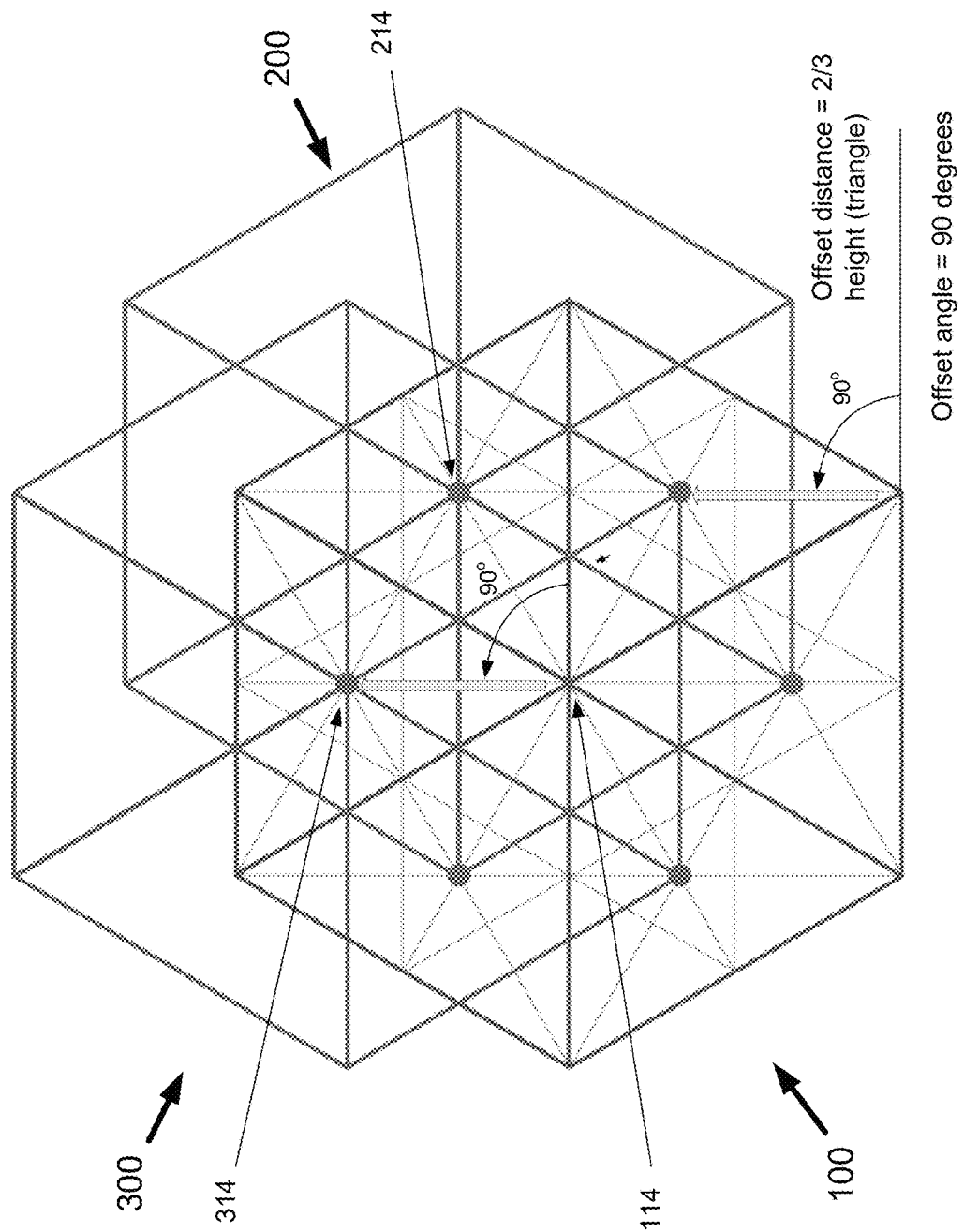
FIG. 5 shows the offset of a third grid hexagonal unit from the first and second grid hexagonal units.

The third grid is created in a similar fashion to the second grid, but with a different offset relative to the first grid. In the embodiment shown, the center point of the hexagonal unit is offset to the midpoint of an equilateral triangle not occupied by a major line intersection of the second grid. FIG. 5 shows the offset of the third grid hexagonal unit shown without interior minor lines) 300 relative to the hexagonal units for the first grid 100 and second grid 200. In this figure, the centerpoint 314 of the third grid hexagonal unit is located at the midpoint of the "northern" equilateral triangle of the equilateral triangle of the first grid hexagonal unit, and the centerpoint 114 of the first grid hexagonal unit is located at the midpoint of the "southern" equilateral triangle of the second grid hexagonal unit. The major line intersections in the third grid are thus located in the equilateral triangles of the first grid not occupied by the major line intersections of the second grid. This is equivalent to offsetting the third grid from the first grid a distance of ⅔ of the height of one of the equilateral triangles at a 90-degree angle with respect to a maximal diameter line (or circumdiameter) of the hexagon (i.e., in FIG. 5, the horizontal line). As a result, the equilateral triangles in any particular grid will be occupied in alternating fashion by the major line intersections of the other two grids, provided the grids overlap.

As the duplication and offsetting of the third grid may have caused portions of the underlying floor plan to become uncovered (i.e., exposed) with respect to the third grid, additional hexagonal units, or equilateral triangle sections thereof, may be added to cover exposed areas. When completed, AP symbols may be added to the third grid as well.

Figure 6:
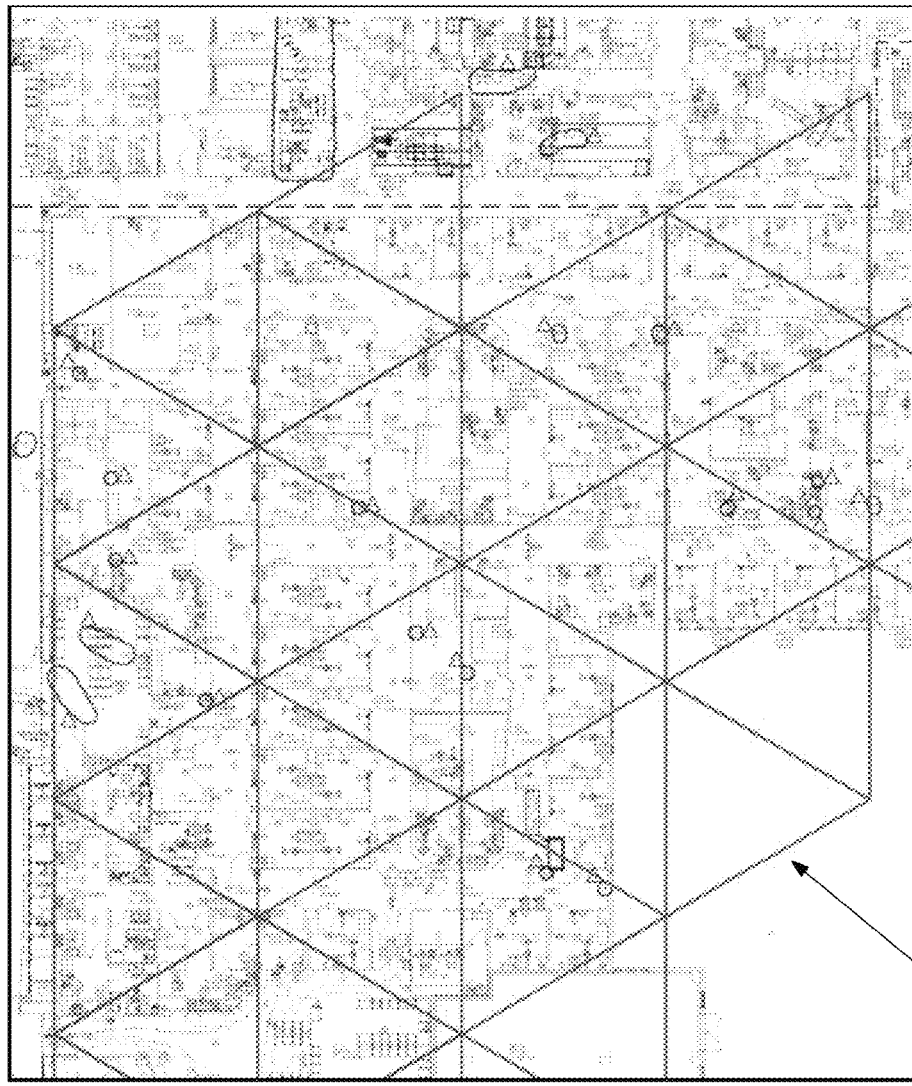
FIG. 6 shows the superimposition of a first grid or matrix on a building floor plan.
Figure 7:
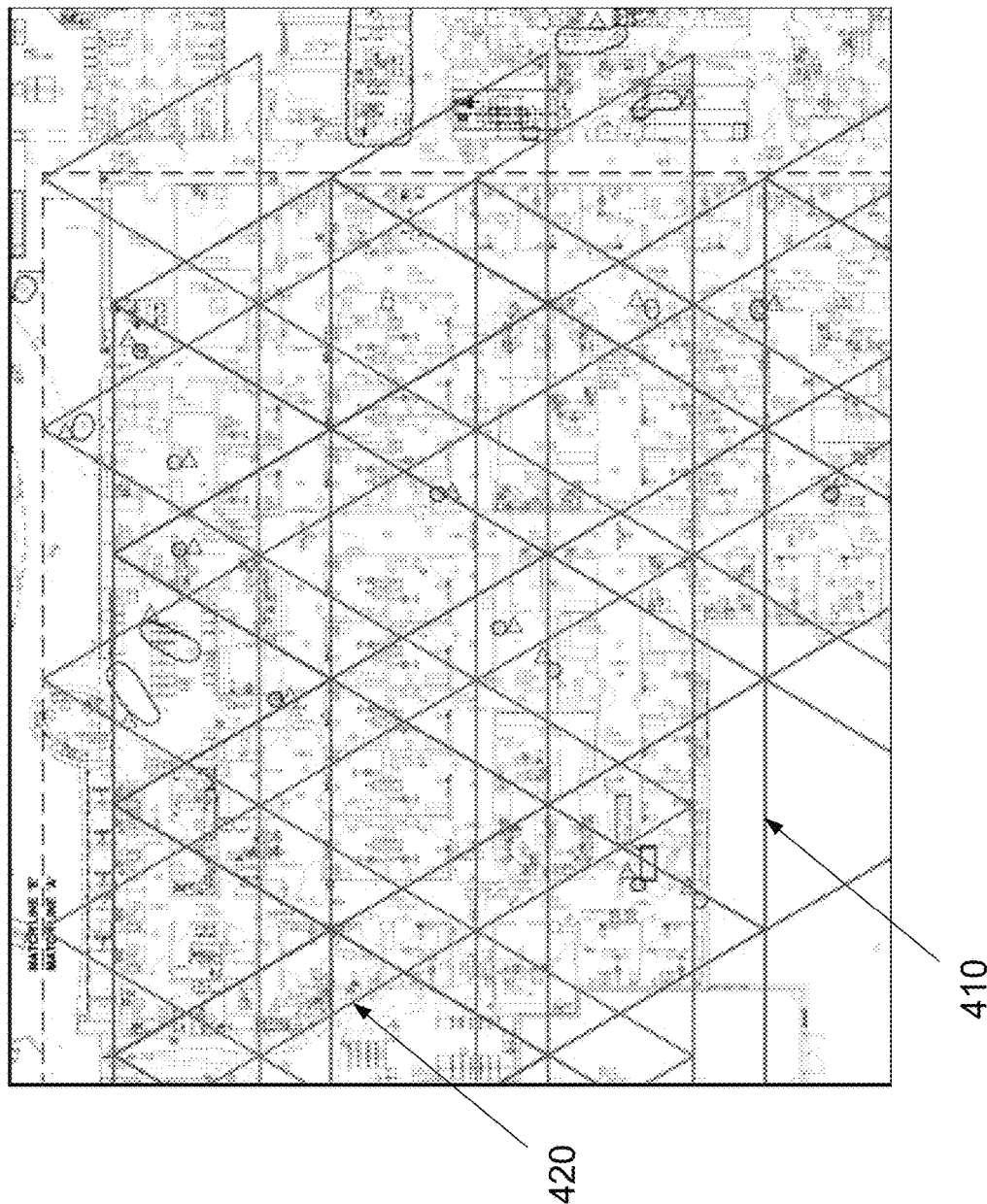
FIG. 7 shows the superimposition of a second grid or matrix to FIG. 6.
Figure 8:
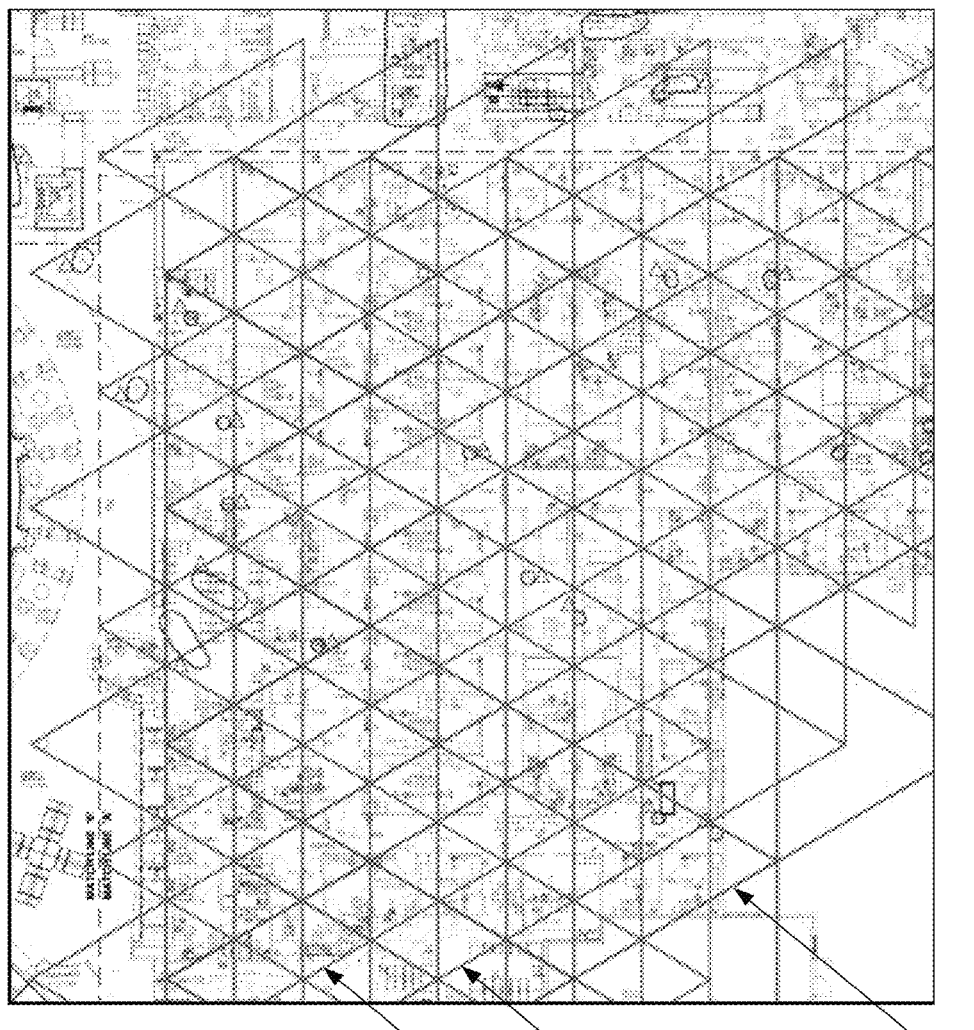
FIG. 8 shows the superimposition of a third grid or matrix to FIG. 7.

FIGS. 6-8 show the addition of successive layers of grids to a floor plan (minor lines in all grids are not shown, for clarity). FIG. 6 shows the superimposition of a first grid 410. FIG. 7 shows the addition of a second grid 420. FIG. 8 shows the addition of a third grid 430. In the embodiment shown, the grids are not rotated with respect to each other, although as noted above, they may be rotated to fit the area or floor plan.

Figure 19:
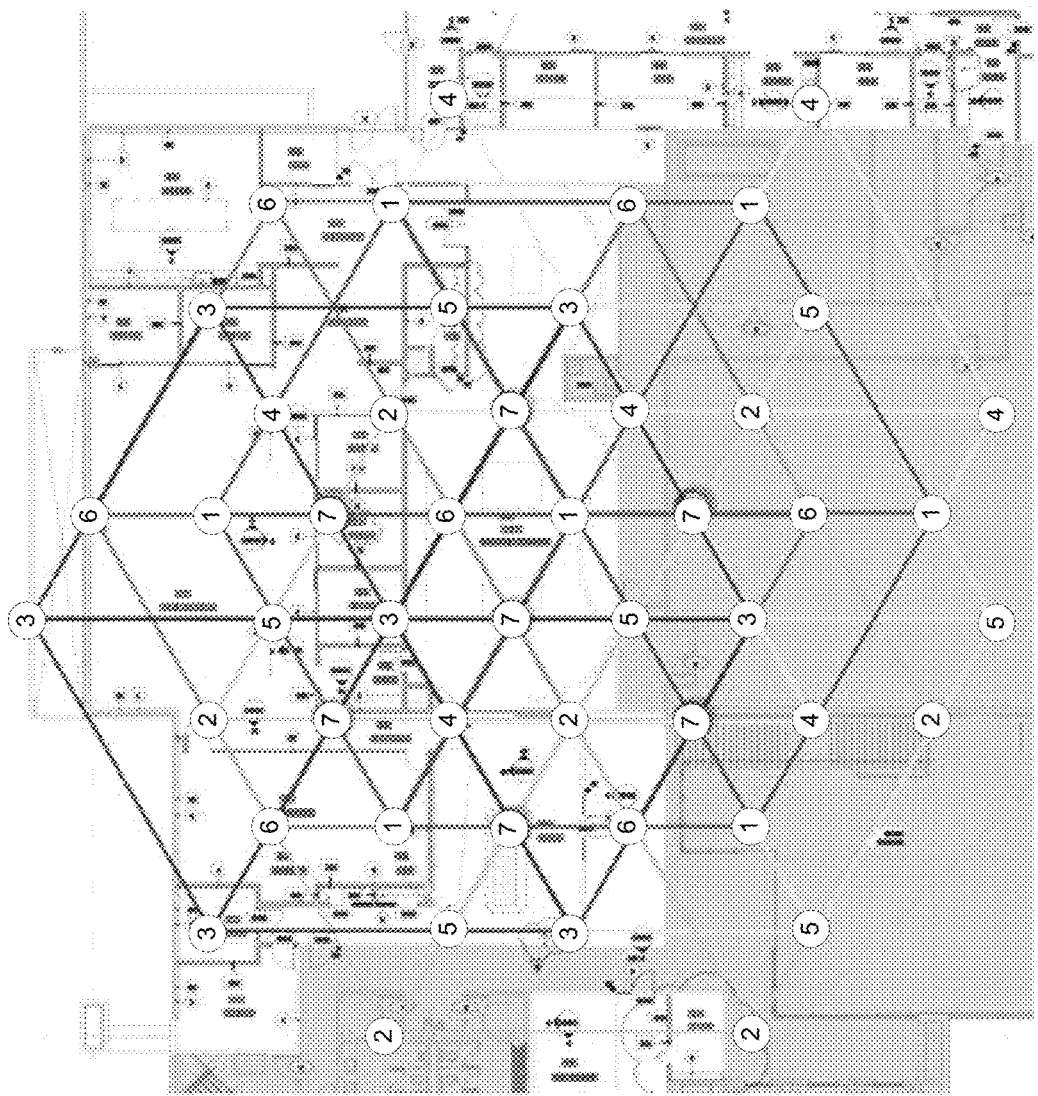
FIG. 19 shows a seven layer AP grid overlay.
Figure 20:
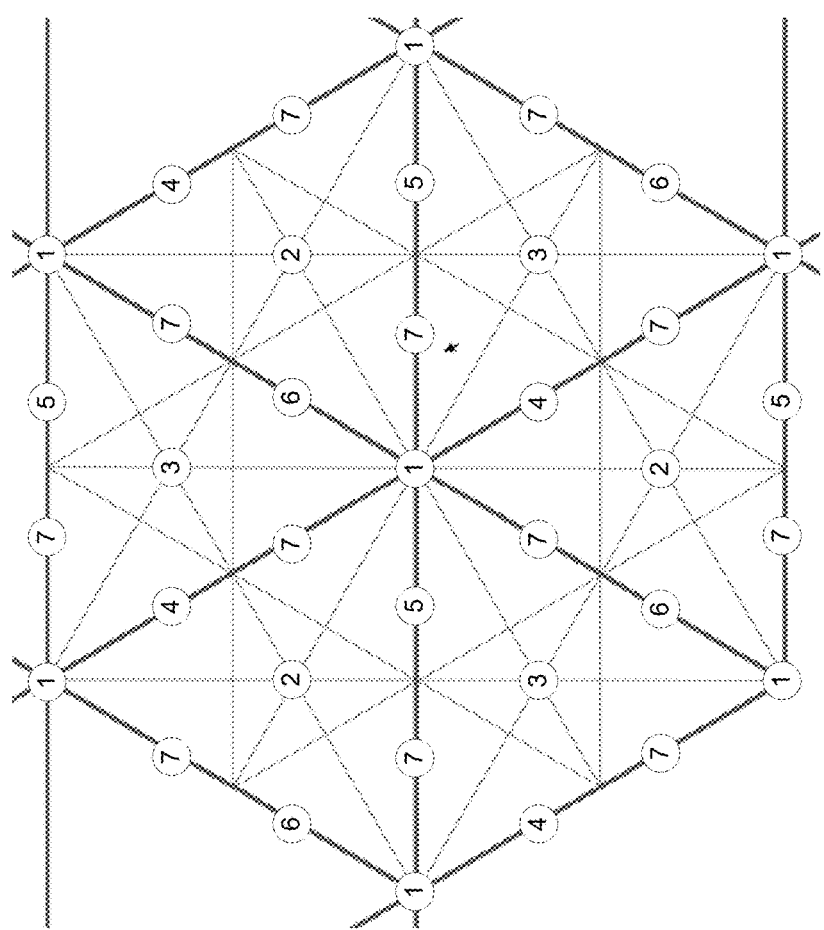
FIG. 20 shows the first grid base hexagonal unit with the location of overlapping AP points from layers 2 through 7 indicated thereon.

In additional embodiments, additional layers beyond three can be added. For example, a seven layer network can be created, based and expanding upon the above-described three layer network. Each layer of the three layer network is translated, shifted, or rotated by 30 degrees (with respect to the orientation previously shown) horizontally and vertically, thereby creating three new layers (e.g., four, five and six, or, in color, cyan, yellow, magenta) with new sets of intersections. Described with respect to the base first hexagonal unit, the hexagonal unit is translated along three alternating circumradial lines (i.e., the major lines extending between the vertices and the center point of the hexagon) a certain distance (in this case, one-third of the length of the major line) to form the three new layers, each offset the same distance from the first grid at 120 degree spacing. The intersection of all of the vertex-connecting lines from all six layers comprises a seventh layer (e.g., black) effectively formed of smaller, rotated hexagons, as seen in FIG. 19 (only a single hexagon for each layer is shown). For clarity, FIG. 20 shows the base repeating hexagonal unit for the first grid with seven AP points, with all overlapping AP points from the other six layers indicated. In the embodiment shown in FIG. 19, the first six grids are not rotated with respect to each other, while the seventh grid effectively comprises smaller hexagons that are effectively rotated with respect to the other layers. In additional embodiments, one or more grid layers may be rotated with respect to one or more of the other grid layers.

After the initial placement of the desired number of grids, adjustments are made to AP placements to address various issues, such as when APs are located outside the building envelope, or are initially placed in a location where APs cannot be located, such as an elevator or obstacle (e.g., steel beam).

Figure 9:
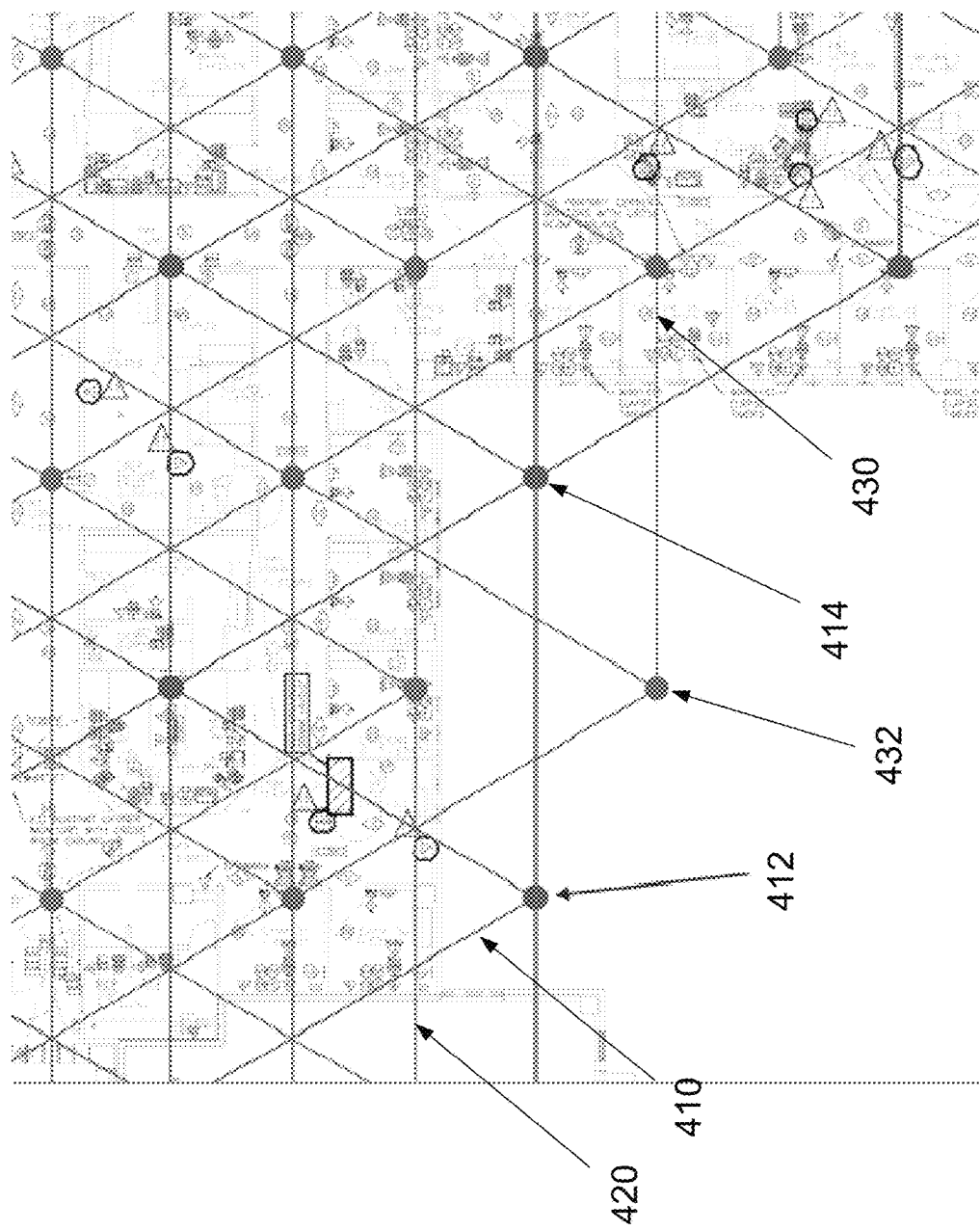
FIG. 9 shows a section of a building floor plan with three layers, with several APs outside the building walls.

AP elements that are located outside of a building wall are either eliminated/deleted, or moved inside of the building wall. FIG. 9 shows an example of a section of a building plan with three grids 410, 420, 430 superimposed. A number of AP placement locations are located outside the building wall in this example: two AP elements on the first grid (412, 414) and another AP element on the third grid (432).

Figure 10:
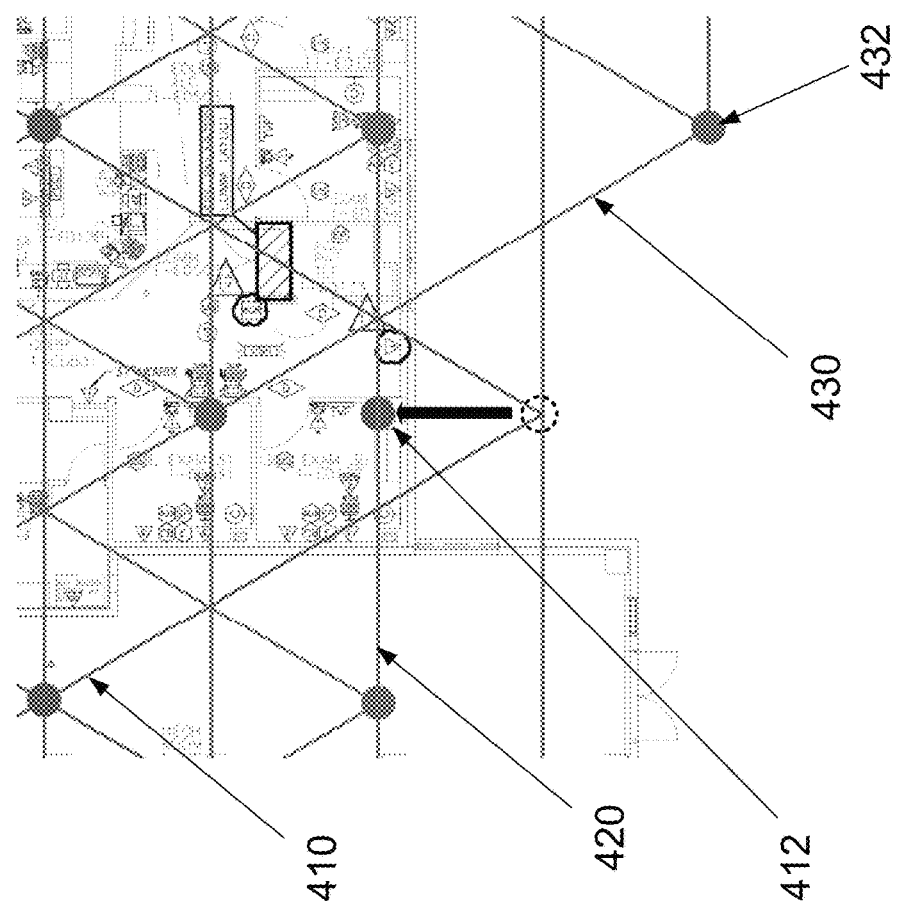
FIG. 10 shows movement of an outside AP to a point inside the building wall.

In the simple case of an AP element outside of a wall, the AP is moved inside the building wall if the outside AP element is within 50% of the height of the corresponding triangle (or within 50% of the length of the corresponding triangle leg) of the building wall. If the outside AP is this close to the building wall, then the nearest AP in the same grid/layer that is inside the building (in this case, AP element 416) will be too far from the wall for its signal to reach the wall, thereby resulting in a gap in coverage near the wall. The outside AP 412 is moved towards the centerpoint of the corresponding equilateral triangle to a point just inside of the wall (ideally, no further than and upon the next major line for any grid), as seen in FIG. 10. This movement places the AP element in a location where it is still equidistant from the other two vertices of the corresponding equilateral triangle.

Figure 11:
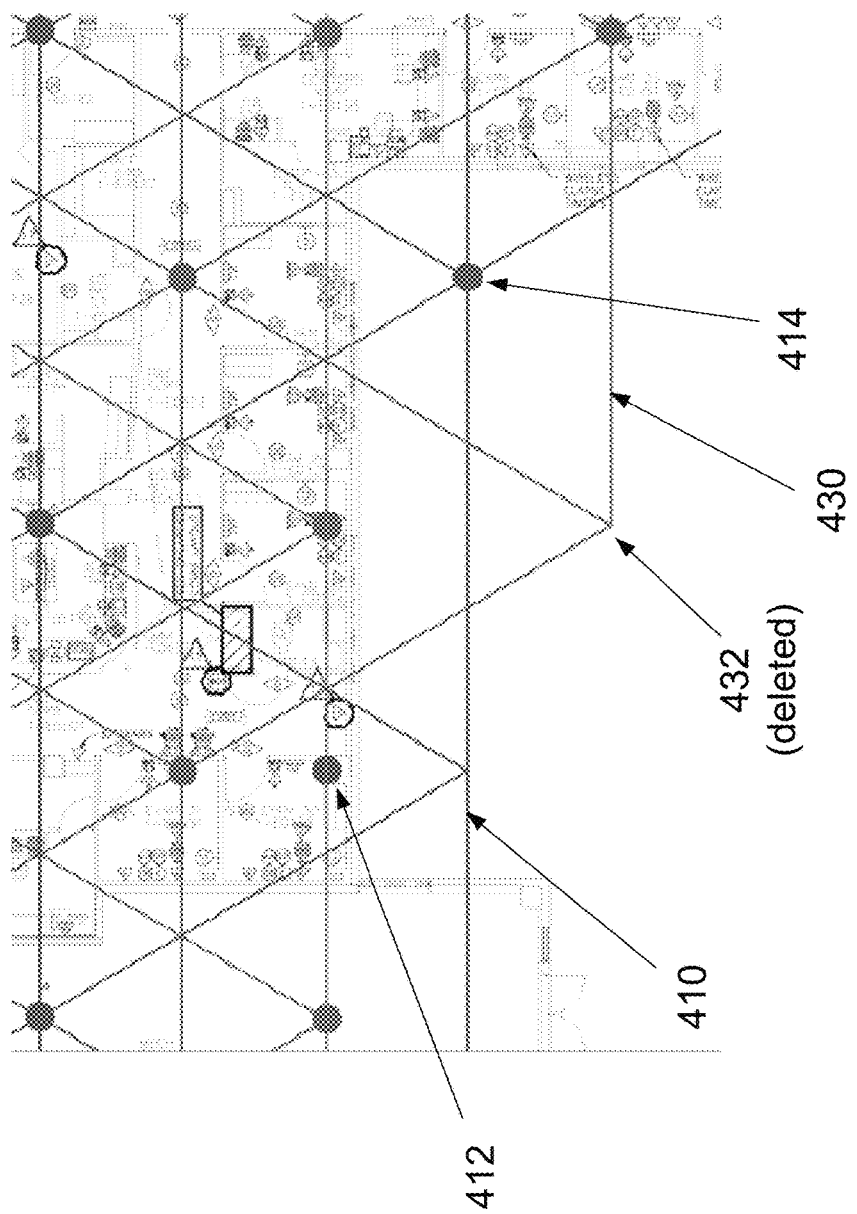
FIG. 11 shows the removal of an outside AP.

As seen in FIG. 9, the outside AP element 432 on the third grid is more than 50% of the height of the corresponding triangle (or more than 50% of the length of the corresponding triangle leg) from the building wall. Because the nearest AP elements in this same grid are close enough to the building wall to provide coverage, this outside AP element is simply removed, as seen in FIG. 11.

Figure 12:
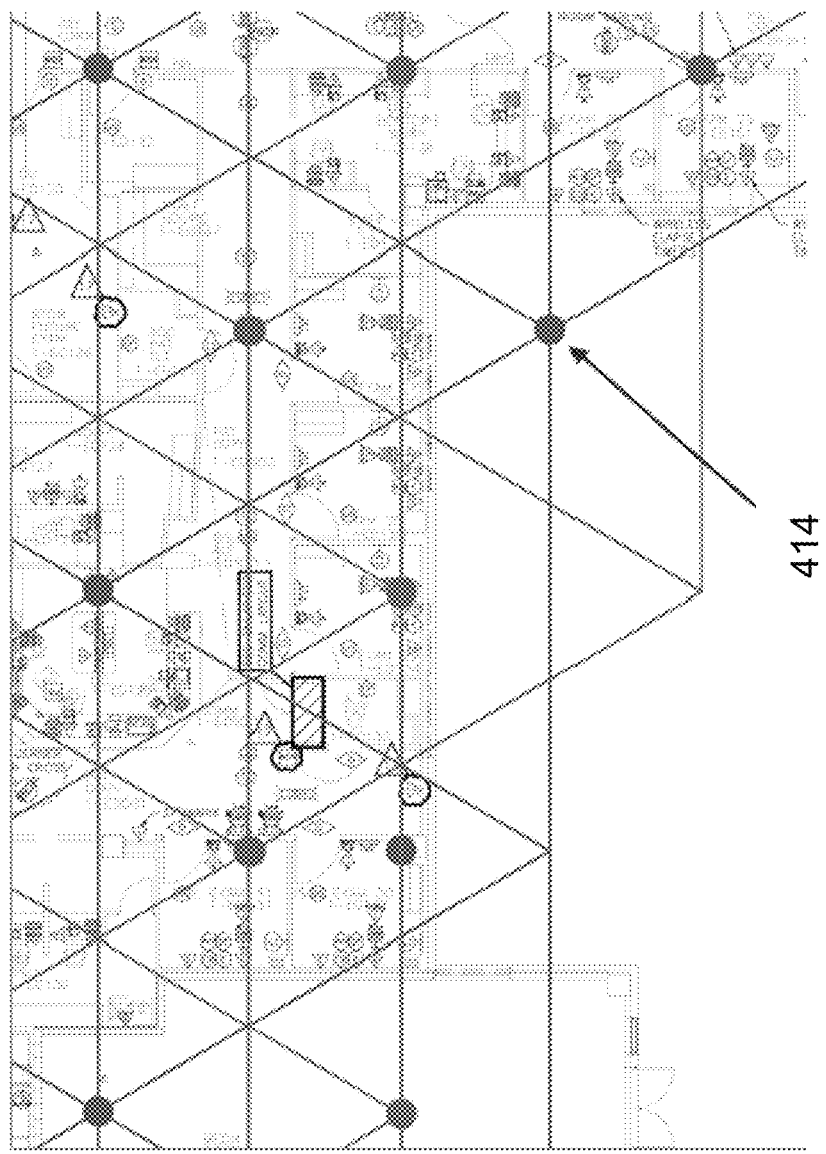
FIGS. 12 and 13 show duplication and movement of an outside AP near a building inside corner.
Figure 13:
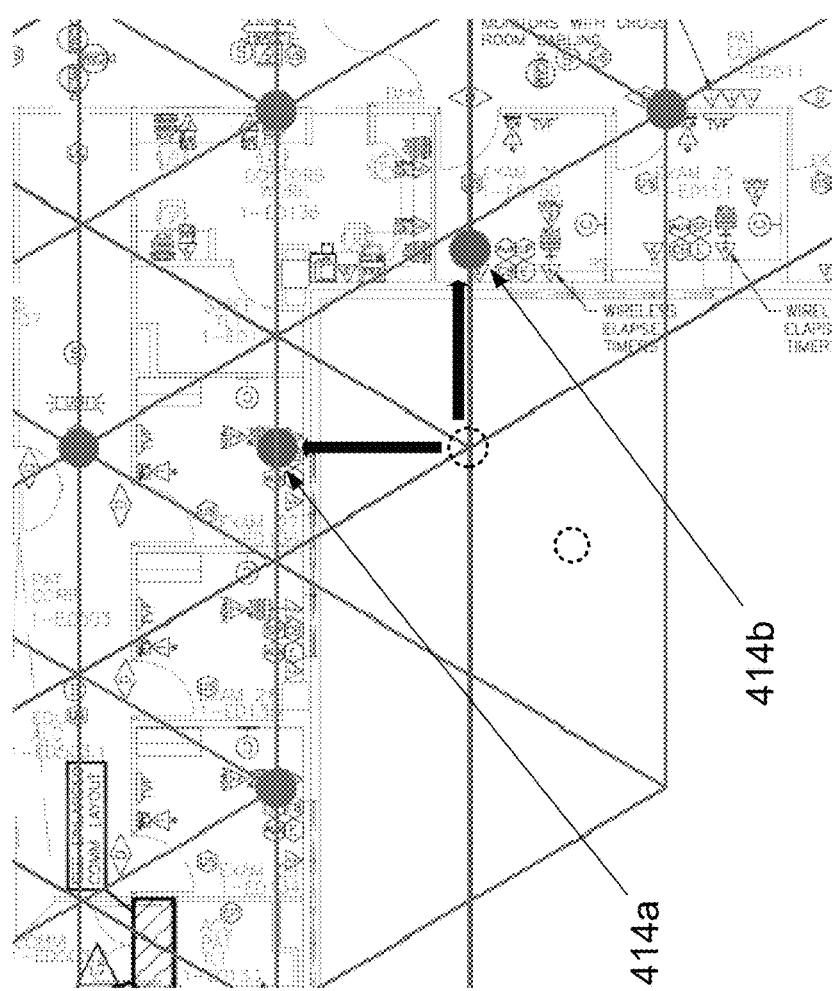

FIG. 12 shows a more complex situation of an exterior AP element 414 on an "inside" corner in close proximity (i.e., within 50%, as described above) to two (or more) building walls. If this AP element were only in close proximity to one of the corner walls, then it can be treated as a simple single wall movement situation, as described above. However, in the situation shown, a simple movement towards one wall or the other would leave a coverage gap along the other wall. Accordingly, the AP element is duplicated 414a, b, and each is moved to a position inside of each corresponding wall. As seen in FIG. 13, AP element 414a is moved towards the centerpoint of the corresponding equilateral triangle to a point just inside of the wall, in a similar manner as AP element 412 as described above. Due to the alignment of the grid relative to the other wall, AP element 414b is moved to the wall along the major line shared by the corresponding equilateral triangles on that side to a point just inside the wall (and ideally, no further than the next major line for any grid).

Figure 14:
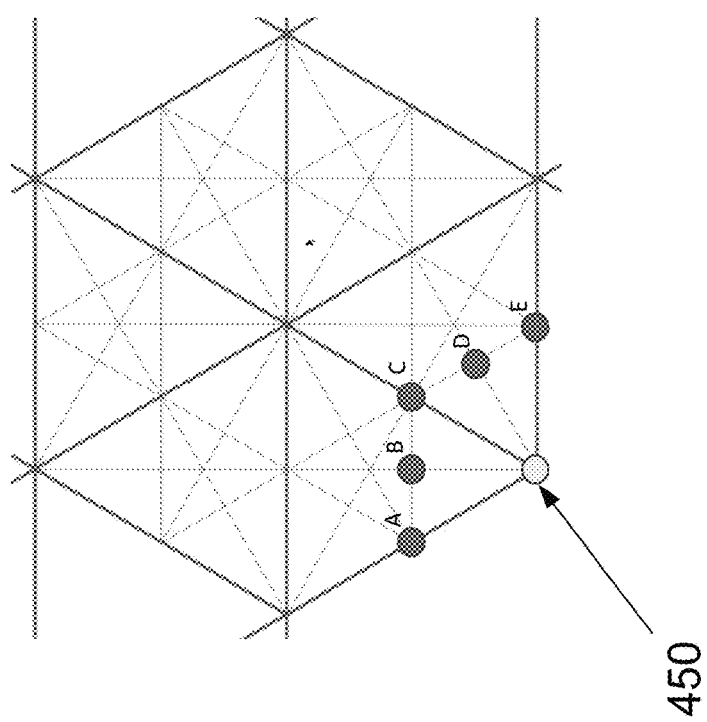
FIG. 14 shows possible movements of an AP.

It should be noted that the above examples represent ideal movements of the outside AP elements to an interior position. However, in an actual installation, placement at these locations may not be possible, and alternative movements and placement locations may be needed. FIG. 14 shows a single grid/layer, where AP element 450 is located in close proximity outside of a building wall located above or to the right (or both, in the case of a corner). The AP element is moved along either major or minor lines to a position just inside the wall, but no further than the mid-points of those lines, as indicated by points A, B, C, D and E.

Figure 15:
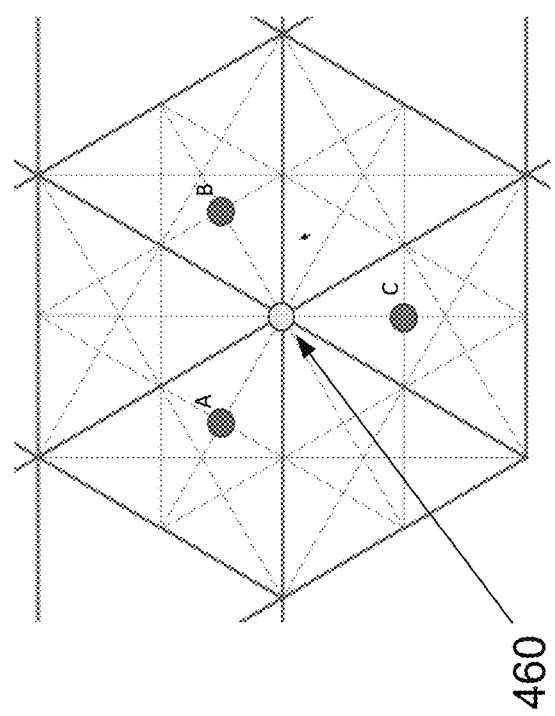
FIG. 15 shows placement of APs around an obstacle.

FIG. 15 shows a situation where an obstacle to RF (e.g., steel beam, elevator shaft, stairwell, or the like) is located at an initial AP placement location 460. Simply moving the AP to a location to the side is likely to result in coverage gaps on the other side of the obstacle. Accordingly, as seen in FIG. 15, the AP element is triplicated, and each then moved along one of three alternating minor lines towards the corresponding triangle centerpoints to positions A, B and C, but no further than the next intersecting minor line. Depending on the size of the obstacle relative to the grid (e.g., multiple elevator bank, lead-line rooms, and the like), more than three AP elements may be similarly moved and positioned around the obstacle.

Figure 16:
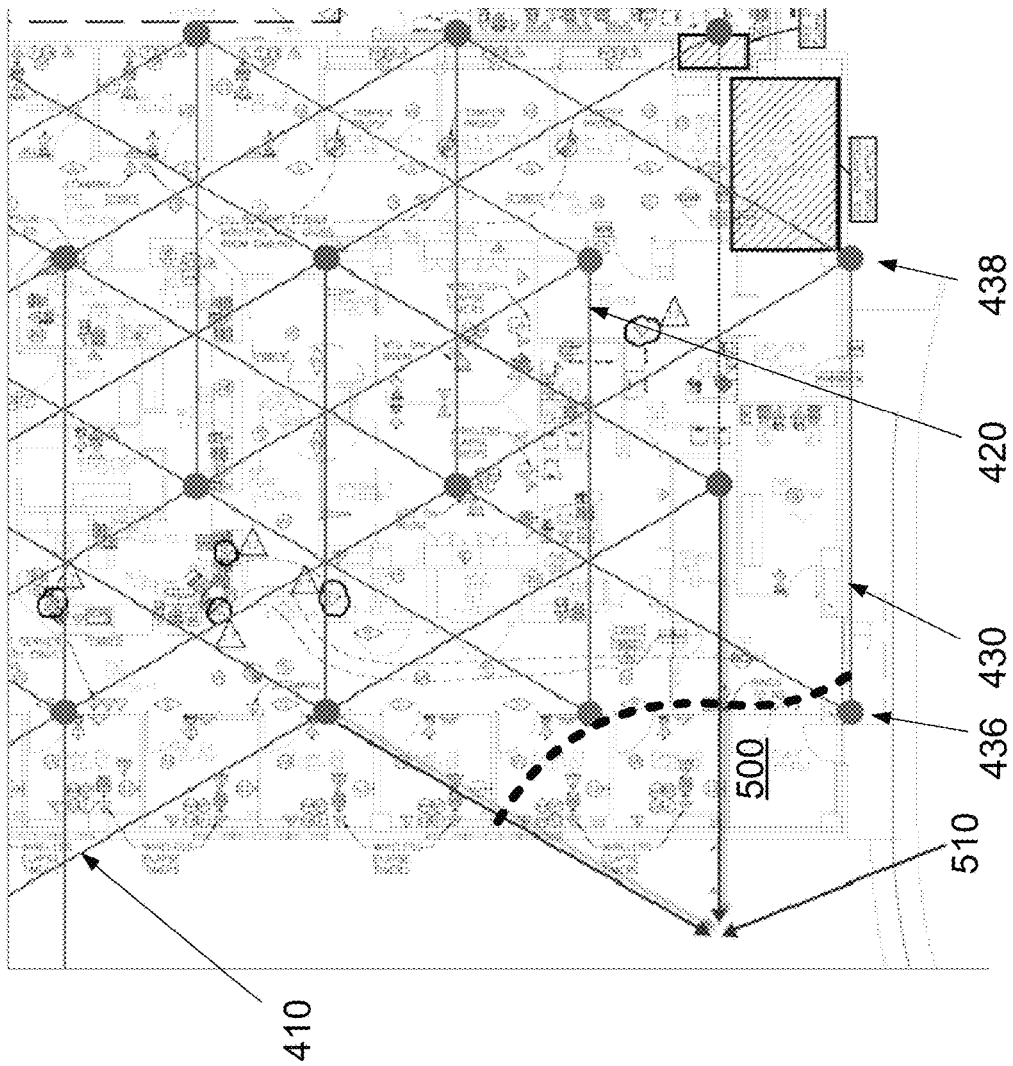
FIG. 16 shows an example of a coverage hole.

While the grids should be sized to encompass the entire building envelope, it is possible for inadvertent coverage holes to develop as a result of not extending all possible grid layers beyond the building envelope during the initial creation process, or when moving or positioning grids thereafter. FIG. 16 shows an example of a coverage hole (roughly corresponding to the area 500) in the first grid 410 (i.e., a spot inside the building envelope that is not covered by a AP element on the grid). To fill this coverage hole, the major lines of the first grid are extended to an AP location point 510 outside the building envelope (i.e., where an AP element for the first grid would have been located if the grid initially had covered the building envelope). The added AP location point 510 is then moved inside the building wall as described above.

Figure 17:
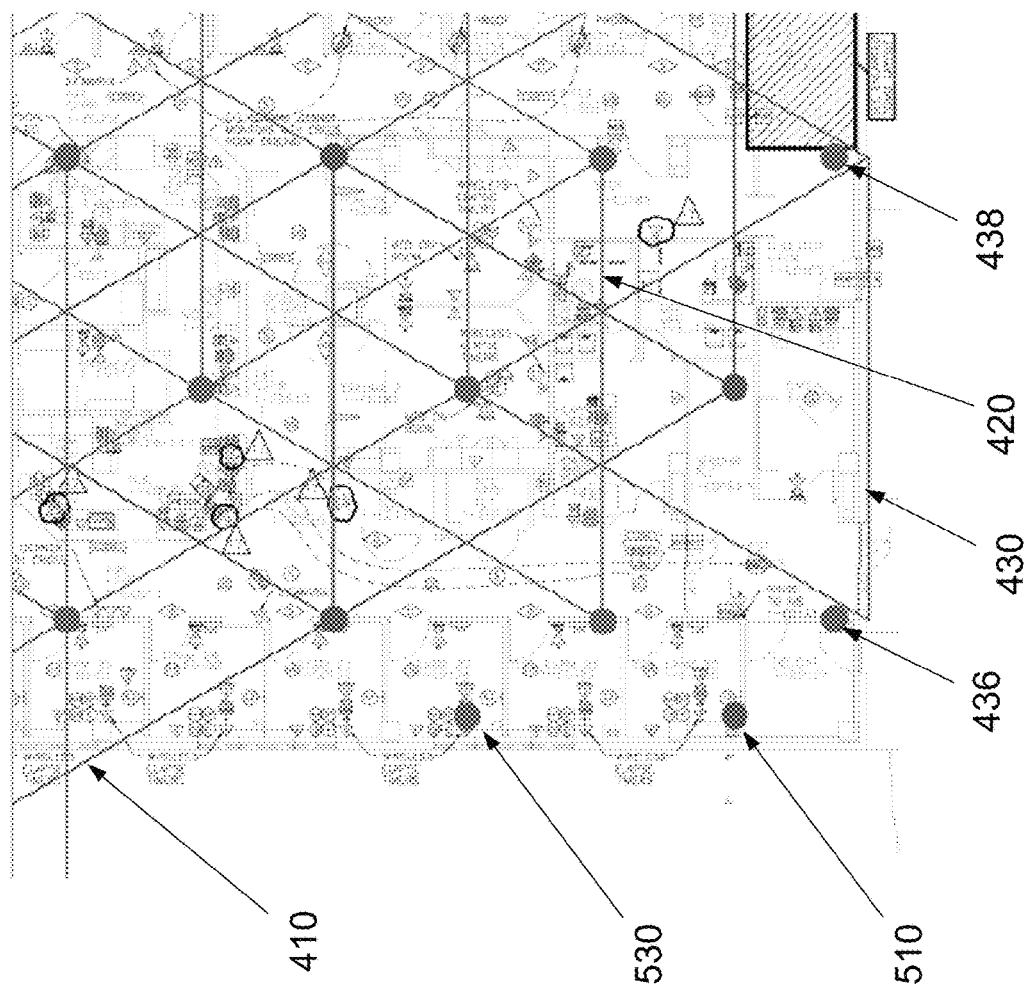
FIG. 17 shows the addition of APs to remove the coverage hole of FIG. 16.
Figure 18:
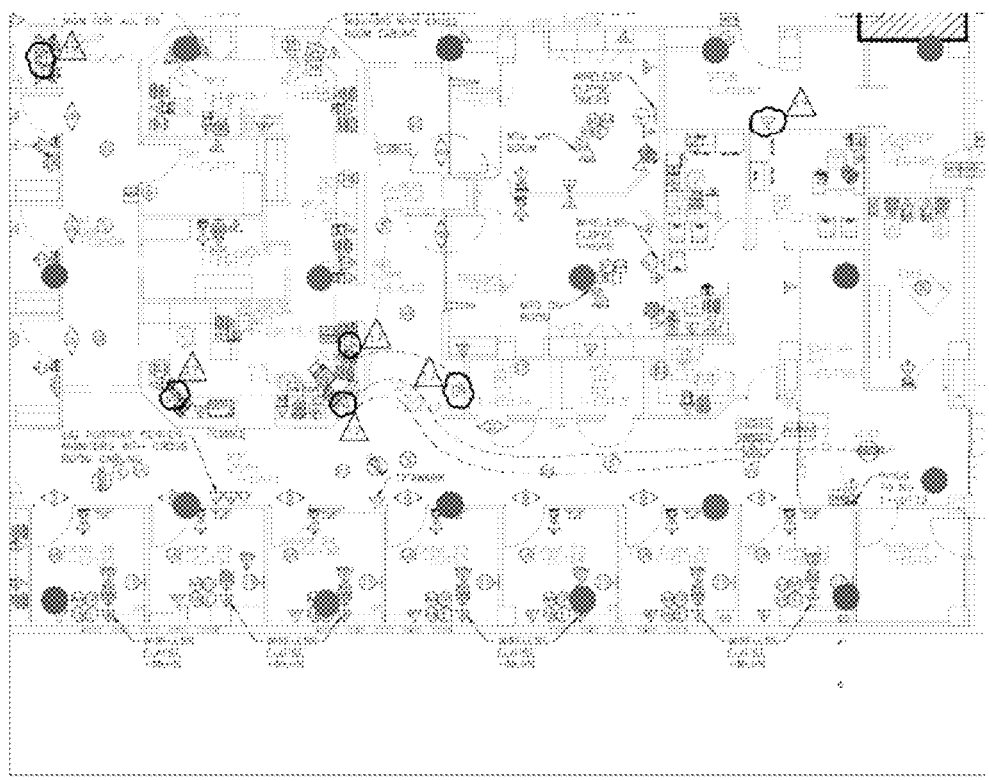
FIG. 18 shows an expanded view of FIG. 17, with additional edge APs added and all grid lines removed.

FIG. 16 also shows a similar coverage hole for the third grid 430 just above the hole for the first grid 410. This is filled by an added AP location point in the same manner as just described for the first grid. Further, two AP points 436, 438 on the third grid are located just outside the lower building wall, and need to be moved inside the wall as described above. FIG. 17 shows the resulting design, with first grid AP 510 added to the first grid and moved inside the wall, third grid AP 530 added to the third grid and moved inside the wall, and the two existing third grid APs 436, 438 moved inside the wall. FIG. 18 shows an expanded view of the section of the design shown in FIG. 17, but with additional edge APs added along the left edge of the building, and all grid lines removed.

When placement of all APs for all grids is final and complete, the grids are removed, leaving only the AP icons or indicators in the proper locations on the floor plan or drawing. The design is then saved in appropriate electronic form (e.g., PDF), and reviewed for approval. Where there are multiple floors or levels of a building, each will have their own multi-layer design document.

For installation, the design document is modified to include appropriate identification labels for each AP. For example, where there are three layers/grids/networks, each AP may have an alphanumeric label comprising a layer indicator (e.g., A, B, C), a two or three digit floor or area number (e.g., 01, 02, 03), and a multiple digit AP number (e.g., 01, 02, 03). Thus, the eighth AP for a primary network located in the first floor emergency room of a hospital may be labeled "A-01-08." The labeling and number of the APs will vary by specific building, depending on number of floors, floor size, and similar elements.

The wired network should be prepared to accept the wireless APs, and provisioning, installation, and testing of the APs should proceed according to industry standards as known in the art (including, but not limited to channel assignments, power settings, and switch mapping). Configurations and settings may vary depending on the number and extent of layers.

With regard to installation of APs, the APs should be located at the design point as indicated on the design document, but may be moved within a 2 foot radius of the designated placement point when required to avoid HVAC plenums, light fixtures, fire sprinklers, and the like. If the relocation requires movement beyond a certain distance (e.g., 6 inches), then the actual as-built location should be indicated on the work drawing and updated on the design document for RF parameter re-adjustment and validation. If movement more than 2 feet from the design point is needed, prior approval and design change notification should be received.

Figure 21:
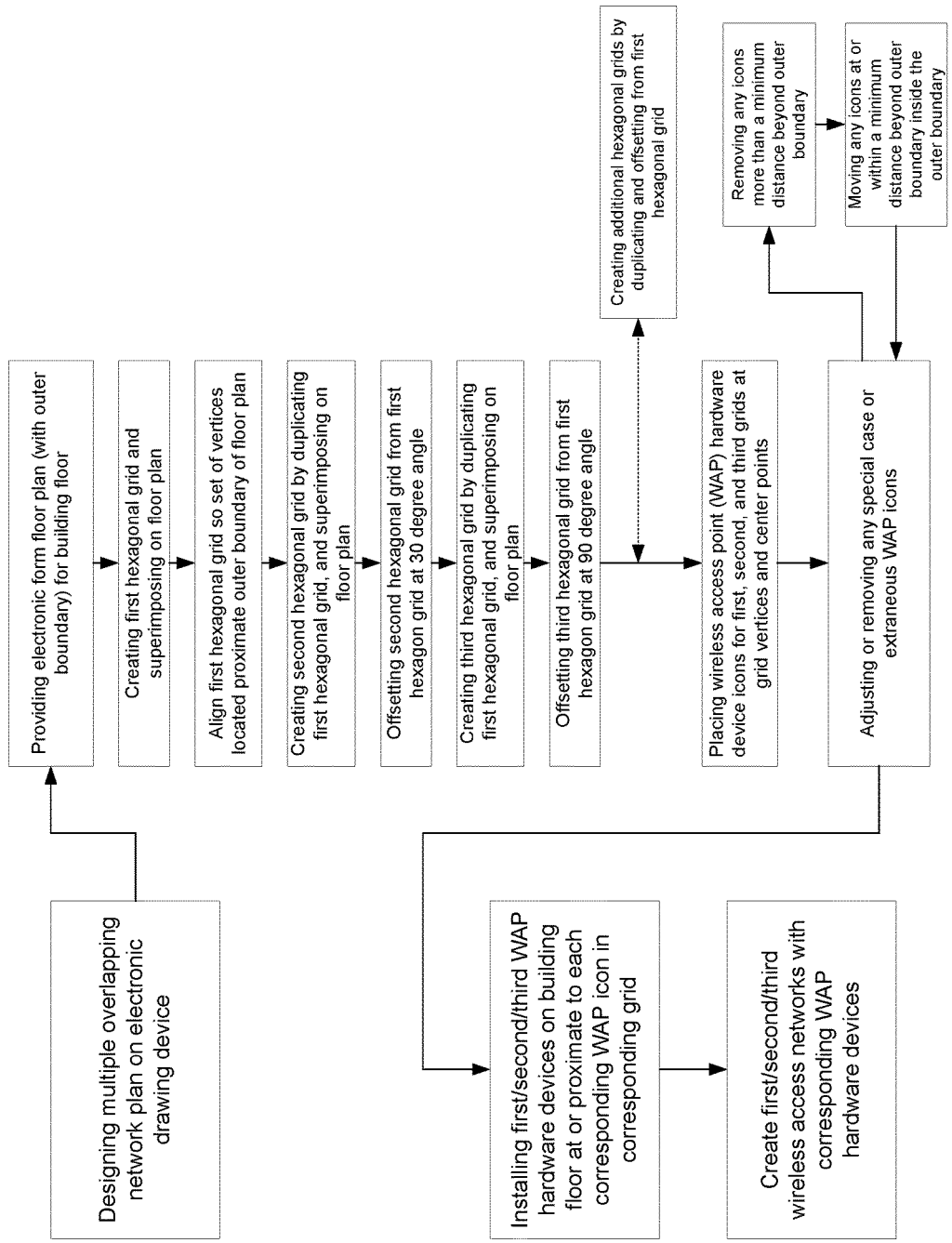
FIG. 21 shows a diagram of a method of designing and installing multiple overlapping wireless networks in accordance with another exemplary embodiment of the present invention.

An exemplary method of designing and installing multiple overlapping wireless networks in an area (as shown in FIG. 21) comprises the steps of (1) designing a multiple overlapping wireless network plan on an electronic drawing device, said designing comprising the steps of:

providing, in electronic form, a floor plan for a floor in a building, said floor plan comprising an outer boundary;

creating a first hexagonal grid comprising a plurality of equal-sized hexagons with six sides of length L, each hexagon with six vertices and a center point, each hexagon further comprising six equilateral triangles with bases corresponding to the six side;

superimposing the first hexagonal grid on the floor plan, wherein the first hexagonal grid extends beyond the outer boundary;

aligning the first hexagonal grid so that a set of vertices are located proximate to, but inside, a section of the outer boundary;

creating a second hexagonal grid by duplicating the first hexagonal grid and superimposing the second hexagonal grid on the floor plan;

offsetting the second hexagonal grid from the first hexagonal grid a distance equal to ⅔ of the height of an equilateral triangle at a 30 degree angle to a first maximal diameter line of a hexagon in the first hexagonal grid, without rotation of the second hexagonal grid;

creating a third hexagonal grid by duplicating the first hexagonal grid and superimposing the third hexagonal grid on the floor plan;

offsetting the third hexagonal grid from the first hexagonal grid a distance equal to ⅔ of the height of an equilateral triangle at a 90 degree angle to the first maximal diameter line, without rotation of the third hexagonal grid;

placing icons for first wireless access point hardware devices (first WAPs) at each first hexagonal grid vertex and center point placing icons for second wireless access point hardware devices (second WAPs) at each second hexagonal grid vertex and center point placing icons for third wireless access point hardware devices (first WAPs) at each third hexagonal grid vertex and center point and adjusting or removing any special case or extraneous icons;

(2) installing, on the floor in the building corresponding to the floor plan, a plurality of first, second and third wireless access point hardware devices at or proximate to each corresponding wireless access point icon in the corresponding hexagonal grid; and (3) creating a first wireless access network with said plurality of first wireless access point hardware devices, a second wireless access network with said plurality of second wireless access point hardware devices, and a third wireless access network with said plurality of third wireless access point hardware devices. Prior to the step of installing, the method may further comprise the steps of removing any icons that are located more than a minimum distance beyond the outer boundary, and moving any icons that are located at or within the minimum distance beyond the outer boundary to a location inside the outer boundary. In some embodiments, as described above, the minimum distance is ½ of the height of an equilateral triangle forming a hexagon in the corresponding grid. The method may also comprise, prior to the step of installing, the step of creating one or more additional hexagonal grids beyond the third hexagonal grid by duplicating the first hexagonal grid and offsetting each of said one or more additional hexagonal grids so that no vertices or center points of any hexagonal grid are directly superimposed over each other.

Installation, verification of settings, and validation of the complex system as a whole may be performed according to the appendices of U.S. Provisional App. No. 62/489,893, and are incorporated herein in their entireties by specific reference for all purposes. This includes the connection of the AP layers to the wired network or networks, thereby reducing the possibility of a single point of failure.

The multiple-layer network system resulting from the above system provides excellent RF coverage throughout the area, and complete separation of traffic by layer.

The invention thus provides a means to design with foreknowledge the placement of at least seven independent wireless networks with certainty that each network (i) will have sufficient RF coverage, (ii) will be geometrically correct with respect to coverage and location triangulation, and (iii) will not interfere (when configured as described herein) with any of the other independent networks, thus allowing for segregation of traffic by user choice of criteria (i.e., type—guest vs. enterprise, short burst vs. long payload, and other criteria independent of the network itself).

The design, installation, provisioning, verification, and turn-up procedures in turn ensure that when followed all matters described above are complete and functional. Design procedures relate to the method of laying out the APs and channel planning the radios once positioned in the building spaces. Installation procedures deal with documentation as to exact placement, as well as tracking of the particular identities of the APs such that this information may be attached to the design within the management system (controllers) of the APs. Provisioning procedures deal with ensuring that the channel and power plan designed is applied to the APs where and as installed. Verification procedures deal with ensuring that all APs after installation and provisioning are in fact operational on the channels and power settings as designed. The procedure is designed to be non-intrusive such that if the new system is installed as an overlay within an existing system, the verification has minimal, if any, impact on the existing system. Verification further ensures that all device types which will be used on the network can in fact connect, and any discrepancies are remedied prior to turn up. Turn-up procedures deal with how to enable the new network, turn down any existing network, and transition to a live operational system.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A multiple overlapping layer wireless network system for providing coverage in an area, comprising:
    a first wireless network comprising a plurality of first wireless access point hardware devices (first WAPs);
    a second wireless network comprising a plurality of second wireless access point hardware devices (second WAPs); and
    a third wireless network comprising a plurality of first wireless access point hardware devices (third WAPs);
    wherein the first wireless network, second wireless network, and third wireless network overlap in an area;
    wherein the plurality of first WAPs are arranged in a first hexagonal grid, the plurality of second WAPs are arranged in a second hexagonal grid, and the plurality of third WAPs are arranged in a third hexagonal grid;

wherein each hexagonal grid comprises a plurality of equal-sized hexagons with six sides of length L, each hexagon with six vertices and a center point, each hexagon further comprising six equilateral triangles, each equilateral triangle having a base corresponding to a side, and a height or altitude extending from the middle of the base to the center point of the corresponding hexagon;

wherein corresponding WAPs are located at or proximate to each hexagon vertex or center point in the corresponding hexagonal grid;

wherein the second hexagonal grid is offset from the first hexagonal grid, and the third hexagonal grid is offset from the first hexagonal grid and the second hexagonal grid.

2. The wireless network system of claim 1, wherein the hexagons in the first hexagonal grid, second hexagonal grid, and third hexagonal grid are equal in size.

3. The wireless network system of claim 2, wherein the second hexagonal grid is offset from the first hexagonal grid a distance equal to ⅔ of the height of an equilateral triangle at a 30 degree angle to a first maximal diameter line of a first hexagon.

4. The wireless network system of claim 3, wherein the third hexagonal grid is offset from the first hexagonal grid a distance equal to ⅔ of the height of an equilateral triangle at a 90 degree angle to the first maximal diameter line.

5. The wireless network system of claim 4, wherein the hexagonal grids are not rotated with respect to each other.

6. The wireless network system of claim 1, wherein the area comprises a building floor.

7. The wireless network system of claim 1, wherein the traffic on each wireless network is segregated from the other wireless networks.

8. The wireless network system of claim 1, wherein at least one of the wireless networks has a higher security level than the other wireless networks.

9. The wireless network system of claim 1, wherein the WAPs in each of the wireless networks are located to not interfere with WAPS in the other wireless networks.

10. The wireless network system of claim 1, wherein the WAPs in each of the wireless networks are located to provide complete coverage for the corresponding wireless network in the area.

11. The wireless network system of claim 1, wherein the first wireless network is a highly secure network limited to employees of a business, the second wireless network is a secure network, and the third wireless network is a less secure network open to guests or visitors of the business.

12. A method of designing and installing multiple overlapping wireless networks in an area, comprising:

designing a multiple overlapping wireless network plan on an electronic drawing device, comprising the steps of:

providing, in electronic form, a floor plan for a floor in a building, said floor plan comprising an outer boundary;

creating a first hexagonal grid comprising a plurality of equal-sized hexagons with six sides of length L, each hexagon with six vertices and a center point, each hexagon further comprising six equilateral triangles with bases corresponding to the six side;

superimposing the first hexagonal grid on the floor plan, wherein the first hexagonal grid extends beyond the outer boundary;

aligning the first hexagonal grid so that a set of vertices are located proximate to, but inside, a section of the outer boundary;

creating a second hexagonal grid by duplicating the first hexagonal grid and superimposing the second hexagonal grid on the floor plan;

offsetting the second hexagonal grid from the first hexagonal grid a distance equal to ⅔ of the height of an equilateral triangle at a 30 degree angle to a first maximal diameter line of a hexagon in the first hexagonal grid, without rotation of the second hexagonal grid;

creating a third hexagonal grid by duplicating the first hexagonal grid and superimposing the third hexagonal grid on the floor plan;

offsetting the third hexagonal grid from the first hexagonal grid a distance equal to ⅔ of the height of an equilateral triangle at a 90 degree angle to the first maximal diameter line, without rotation of the third hexagonal grid;

placing icons for first wireless access point hardware devices (first WAPs) at each first hexagonal grid vertex and center point;

placing icons for second wireless access point hardware devices (second WAPs) at each second hexagonal grid vertex and center point;

placing icons for third wireless access point hardware devices (first WAPs) at each third hexagonal grid vertex and center point; and adjusting or removing any special case or extraneous icons; and installing, on the floor in the building corresponding to the floor plan, a plurality of first, second and third wireless access point hardware devices at or proximate to each corresponding wireless access point icon in the corresponding hexagonal grid; and creating a first wireless access network with said plurality of first wireless access point hardware devices, a second wireless access network with said plurality of second wireless access point hardware devices, and a third wireless access network with said plurality of third wireless access point hardware devices.

13. The method of claim 12, further comprising, prior to the step of installing, the steps of:

removing any icons that are located a minimum distance beyond the outer boundary; and moving any icons that are located within the minimum distance beyond the outer boundary to a location inside the outer boundary.

14. The method of claim 12, wherein the traffic on each wireless network is segregated from the other wireless networks.

15. The method of claim 12, wherein at least one of the wireless networks has a higher security level than the other wireless networks.

16. The method of claim 12, wherein the WAPs in each of the wireless networks are located to not interfere with WAPS in the other wireless networks.

17. The method of claim 12, wherein the WAPs in each of the wireless networks are located to provide complete coverage for the corresponding wireless network on the floor.

18. The method of claim 12, further comprising, prior to the step of installing, the steps of:

creating one or more additional hexagonal grids beyond the third hexagonal grid by duplicating the first hexagonal grid and offsetting each of said one or more additional hexagonal grids so that no vertices or center points of any hexagonal grid are directly superimposed over each other.

\* \* \* \* \*